Figure 1:
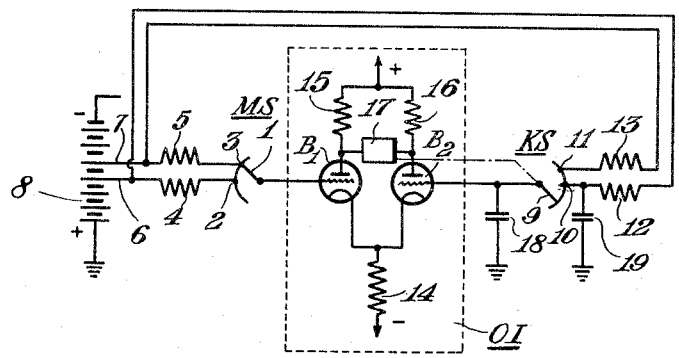

INVENTOR.
ROBERT BERTHOLD BUCHNER
BY
AGENT.

Patented July 28, 1953

2,647,165

UNITED STATES PATENT OFFICE 2,647,165

APPARATUS FOR BREAKING CONTACT RESISTANCE IN A MARKER-CONTROLLED SELECTOR

Robert Bertold Buchner, Eindhoven, Netherlands, assignor to Hartford National Bank and Trust Company, Hartford, Conn., as trustee Application July 29, 1949, Serial No. 107,413
In the Netherlands September 13, 1948

2 Claims. (Cl. 179—18)

The invention relates to circuit-arrangements for use in automatic signalling systems, for example an automatic telephone system, for testing the value of the voltage of outlet contacts of a switch, for example a selector switch, or of the resistance of outlet circuits of such a switch.

In known systems for automatic telephony, switches such as selector switches and call finders are numerically adjusted under the control of a register according to a voltage comparison method. In these systems, outlet contacts of the switch, which are passed over by a test wiper, are marked by a voltage, of which the value is characteristic for the outlet concerned. During the movement of the switch, the potential of the test wiper is compared, with the use of a testing device associated with the register, with a comparison voltage stored in the register in accordance with the number to be selected.

As soon as a free outlet is found, the marking voltage of which is equal to the comparison voltage in the register, the testing device becomes operative and the switch is stopped.

In such systems difficulties arise in practice, since the testing device does not become operative or becomes operative too late at the desired outlet, so that the switch continues to move or stops at an outlet subsequent to the free desired outlet. These difficulties are more likely to occur the smaller the differences between the marking voltages of successive outlets.

It has been found that these difficulties are essentially due to contact resistance occurring between the wiper and the contacts, so that the potential of the wiper does not become equal to that of the contact or does so after an unduly long time.

The contact resistance is particularly troublesome, if the resistance of an outlet circuit of a contact is required to be measured through several cascade-connected switches. Such a condition prevails, for example, in determining a subscriber's criterion. In this event, a test contact of a final selector or of a first call finder has a resistance connected to it, of which the value is an indication of the nature of the subscriber's line connected to the outlet concerned, for example an indication that this line is associated with a P. B. X group. After the switch has been stopped, the value of the indication resistance is tested from the register through a number of switches. Consequently, the contact resistances in the successive stages of selection are in series with the resistance to be tested and have a cumulative effect, so that appreciable measuring errors may occur.

The invention has for its object to mitigate the difficulties due to contact resistances occurring in circuits of test arrangements.

It is pointed out that it is known per se that oxide layers having a very high resistance may form, particularly in dry air, very smoothly polished contacts (such, for example, as occur with rotary switches) through which no direct current flows. This disadvantage is usually mitigated by passing a low direct current through the contacts, for which purpose blocking condensers may be shunted by resistances (coherer arrangement). A low voltage is then set up across the insulating layer, so that the layer breaks down and the contact resistance is reduced.

This method may not provide a sufficiently reliable operation of the testing arrangement and may in some cases be unsuitable in that difficulties may arise.

If, for example, the marking potentials are supplied to the test contacts by way of high resistances and the internal resistance of the voltage comparison device is such that a weak direct current traverses the test wiper, the current produces a voltage drop across the resistances, due to which the marking potentials are disturbed.

The contact resistance may assume very different values. It has now been found that the contact resistance decreases according as a greater current is passed through the contact and that the low resistance value is retained upon subsequent reduction of the current strength.

Contact resistances of the order of 50 ohms were found with contacts traversed by a current of a few milliamps. By a temporary increase of the current, these resistances were reduced to values of the order of 1 ohm.

The invention is based on the recognition that the contact resistance can be reduced to a lower value by passing, prior to the test, a current pulse through the contact.

According to the invention, a circuit-arrangement for use in automatic signalling systems, for example an automatic telephone system, for testing the value of the voltage of outlet contacts of a switch, for example a selector switch, or of the resistance of outlet circuits of a switch is characterized in that upon the wiper of the switch reaching an outlet or upon the switch stopping at an outlet, an electric impulse is produced, by charging or discharging at least one solid condenser, through at least one wiper by way of which a test current is switched on, and through the contact connected to this switch, the maximum value of the impulse being high relative to the current traversing the wiper during the testing operation.

It is pointed out that it is known per se to protect relay contacts acting to interrupt the current passing through an inductance, for example the winding of a vertical or rotary magnet wherein considerable magnetic energy is accumulated, from burning by the spark produced upon interruption, in that these contacts are shunted by a condenser in series with a resistance. In the test circuits, to which this invention relates, there are however, no such inductances liable to endanger the contacts.

In order that the invention may be more clearly understood and readily carried into effect, it will now be described more fully with reference to the accompanying drawing, in which two embodiments thereof are shown by way of example.

Figure 2:
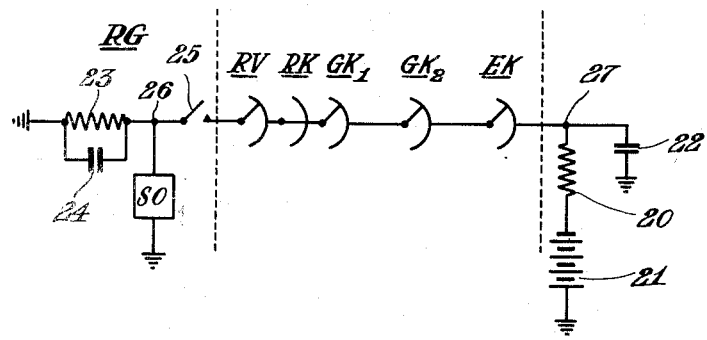

Fig. 1 shows a circuit-arrangement, in which a selector is required to be adjusted according to a direct-voltage comparison method, and Fig. 2 shows a circuit-arrangement for testing a subscriber criterion. The drawing shows only those elements which are essential for a good understanding of the invention.

Referring now to the circuit-arrangement shown in Fig. 1, the reference MS designates a marking switch in a register, which switch comprises a wiper 1 and a number of contacts inter alia 2 and 3. These contacts are connected through resistances 4 and 5 to tappings 6 and 7 of a battery 8, the positive terminal of which is earthed. The dialling pulses transmitted by a subscriber to a register adjust the wiper 1 of the marking switch MS to a definite contact, so that the wiper 1 is connected, through the resistance connected to this contact, to one of the tappings of the battery 8.

Of a selector switch KS which is required to be adjusted, under the control of the register, to a desired outlet, only the wiper 9 and outlet contacts 10 and 11, are shown. These contacts, similarly to the contacts of the marking switch MS, are connected through resistances 12 and 13 to tappings 6 and 7, respectively, of the battery 8. If the switch KS is a group selector, the contacts corresponding to the same number are connected to the same tapping of the battery.

It is assumed that contacts 10 and 11 are adjacent contacts and that these contacts are associated with different number groups, so that they have different potentials.

The selector switch KS is now required to be adjusted to an outlet of which the marking contact has the same potential as the contact of the marking switch MS to which the wiper 1 is set. During the movement of the wipers of the selector switch KS, the potential of the wiper 9 is compared, by the testing device OI of the register, with the potential of the wiper 1 of the marking switch MS.

The testing device OI comprises two discharge tubes $B_1$ and $B_2$ having a high common cathode resistance 14 in order to keep the total emission current of the tubes approximately constant. The anodes of the tubes are fed through resistances 15 and 16 respectively, a relay 17 being connected between the anodes. The control-grid of the tube $B_1$ is connected to the wiper 1 of tube $B_2$ to the wiper 9.

As long as the potentials of the wipers 1 and 9 are unequal, the potentials of the anodes of tubes $B_1$ and $B_2$ are also unequal and the relay 17 is energized.

As soon as the wiper 9 finds a contact of a free outlet, the potential of which is equal to the potential of the wiper 1, the relay 17 is de-energized, so that the energizing circuit of the rotary magnet is interrupted and the movement of wiper 9 is stopped.

It is assumed that the wiper 1 is adjusted to contact 3. After having left contact 10, the selector switch will thus be required to stop at contact 11 which is connected to the same tapping of the battery as contact 3 of the marking switch.

In practice, the switch may not stop at the desired outlet 11. This occurrence may be reduced by connecting the wiper 9 through a condenser 18 to a point of constant potential, for example earth.

If the wiper, on leaving contact 10, has assumed the potential of this contact and the potential difference between contacts 10 and 11 exceeds a few tenths of a volt, the said potential difference will be set up, on engaging contact 11, across the insulating layer between the wiper and the metal contact 11, so that the layer breaks down.

If the wiper has a low capacity relative to earth, the layer will not completely break down, since the energy available is insufficient to change the structure of the layer sufficiently. After partial break down, a potential difference remains so that the difference between the potentials to be compared by the testing device, does not drop below the threshold value at which this device responds and relay 17 becomes de-energized.

The condenser 18 maintains for a short time the higher potential differences set up across the insulating layer, so that a pulse is passed through the layer such that it breaks down completely and the resistance is reduced to a suitable value.

The condenser 18 may have a capacity of 1000 micro-microfarads. Even if the testing device has not an approximately infinite resistance, as is the case in the embodiment shown, interference may occur owing to the voltage distribution through the internal resistance of the testing device and the resistance of the insulating layer. Also in this case, the resistance of the layer can be reduced with the use of a condenser having a suitable value. The time constant of the network constituted by the condenser and resistances should be chosen such that, after the layer has broken down, the testing device has sufficient time to carry out the test.

If the resistances 12 and 13 have a high value, it is advisable that the outlet contacts of the switch should also be connected through a condenser 19, to a point of constant potential. In many cases these condensers may be omitted, since the natural capacity of the outlet contacts relative to earth is, as a rule, sufficiently high, owing to the multiple connection to corresponding contacts of further switches.

In the circuit-arrangement shown in Fig. 2, the outlets of a final selector EK comprise resistances 20 of which the values are characteristic for definite properties of subscriber's sets connected to these outlets. The value of these resistances may, for example, provide an indication that the outlet is connected to the first line of a P. B. X group.

After the final selector has been stopped at a definite line, the subscriber criterion i. e. the value of the characteristic resistance 20 is required to be tested, from a register RG, with the use of a testing device SO. The testing circuit extends through wipers and contacts of a number of cascade-connected switches, for example through a pre-selector RV, a selector of the connecting circuit RK, a first group selector GK₁, a second group selector GK₂ and the final selector EK to the resistance 20.

Upon the closure of a contact 25, a current circuit is completed from earth, through resistance 23, wipers and contacts of the switches, the characteristic resistance 20, through a battery to earth. The potential of point 26 is then tested by the voltage testing device SO.

Owing to the contact resistances of the wiper connected in series with the resistance 20, the potential of test point 26 is adversely affected.

In order to mitigate this disadvantage, a condenser 22 is connected between earth and the end 27 of resistance 20, the end 27 being connected to the outlet contact of the final selector, and the resistance 23 being shunted by a condenser 24.

On closing contact 25, the charging of condenser 22 and discharging of condenser 24 produces an impulse through the contacts of the switches, of which impulse the maximum value is very high relative to the current passing through these contacts during the testing operation. As a result, any contact resistance is materially reduced. During the subsequent voltage test, no current passes through the condensers, so that their presence does not further affect the result of the measurement. It is possible to pass an impulse through the contacts by connecting point 26 to earth for a short time on closing contact 26. In this event condenser 24 may be dispensed with.

In order to reduce the maximum current intensity, it may be desirable to connect a low resistance in series with the condensers.

What I claim is:

1. In an automatic signalling system, a selector switch having a series of outlet contacts and a wiper arm for successively engaging said contacts, means to impress distinguishing potentials on each of said contacts relative to a point of constant potential, a testing device to adjust said wiper arm to a contact at which the potential thereon corresponds to a predetermined marking potential and provided with means for comparing the potential established on said arm with said marking potential and means responsive to the potential difference therebetween to actuate said arm successively to engage said contacts and arresting said arm when the potentials are alike, and means for producing an impulse through said arm upon reaching an outlet contact to overcome the contact resistance thereof, said last named means including a condenser connected between said arm and said point of constant potential and having a value at which the resultant impulse intensity is high with respect to the current traversing the switch in testing operation.

2. An arrangement, as set forth in claim 1, further including a capacitor connected between one of said contacts and said point of constant potential.

ROBERT BERTOLD BUCHNER.

References Cited in the file of this patent

UNITED STATES PATENTS

| Number | Name | Date |
| --- | --- | --- |
| Re. 22,794 | Deakin | Apr. 15, 1941 |
| 1,620,090 | Flad | Mar. 8, 1927 |
| 1,708,982 | Vroom | Apr. 16, 1929 |
| 2,057,890 | Feist | Oct. 20, 1936 |
| 2,179,826 | May | Nov. 14, 1939 |
| 2,183,838 | Hornichkel | Dec. 19, 1939 |
| 2,222,108 | Langer | Nov. 19, 1940 |
| 2,238,223 | Kozma | Apr. 15, 1941 |
| 2,308,860 | Clark | Jan. 19, 1943 |
| 2,354,682 | Herbig | Aug. 1, 1944 |
| 2,454,781 | Deakin | Nov. 30, 1948 |
| 2,462,074 | Deakin | Feb. 22, 1949 |

FOREIGN PATENTS

| Number | Country | Date |
| --- | --- | --- |
| 277,368 | Germany | May 18, 1913 |
| 583,574 | Great Britain | Dec. 20, 1946 |